United States Patent [19]

Semchinov et al.

[11] 3,806,255
[45] Apr. 23, 1974

[54] LINEAR DISPLACEMENT TRANSDUCER FOR A MOVABLE MEMBER OF A COORDINATE-BORING MACHINE

[76] Inventors: Sergei Nikolaevich Semchinov, ulitsa Nikitinskaya, 21, kv. 4; Vsevolod Pavlovich Petrov, ulitsa Aerodromnaya 55, kv. 34; Mikhail Yakovlevich Tabunschikov, ulitsa Pobedy 10, kv. 46; Nikolai Alexeevich Olkhovsky, ulitsa Partizanskaya 228, kv. 53; Pavel Ivanovich Krivosheev, ulitsa XXII Partsiezda 32, kv. 29; Viktor Tikhonovich Verstov, ulitsa Tashkentskaya 124, kv. 79, all of Kuibyshev; Alexandr Georgievich Klabukov, prospekt Karla Marxa, 57 kv. 14; Gennady Yakovlevich Gorbachev, ulitsa Tankovaya 28, kv. 37, both of Novosibirsk, all of U.S.S.R.

[22] Filed: Jan. 11, 1973

[21] Appl. No.: 322,872

[52] U.S. Cl. .............. 356/171, 235/92 PC, 356/169
[51] Int. Cl. ......................................... G01b 11/02
[58] Field of Search .......... 356/164, 168, 169, 170, 356/171; 250/200

[56] References Cited
UNITED STATES PATENTS

| 2,933,013 | 4/1960 | Baker et al. | 356/164 |
| 3,002,421 | 10/1961 | Koulicovitch | 356/164 |
| 2,922,940 | 1/1960 | Mergler | 250/200 |

*Primary Examiner*—Ronald L. Wibert
*Assistant Examiner*—Steven K. Morrison
*Attorney, Agent, or Firm*—Eric H. Waters

[57] ABSTRACT

A linear displacement transducer for the movable member of a coordinate-boring machine, comprising a camera tube, an optical system, a scale-line marker mounted on the machine table, a graticule positioned in the optical system, characterized in that the optical system is constructed such that the projection of the scale-line marker and the projection of the graticule are displaced relative to each other, and the transducer is provided with an automatic Y-shift unit shifting the electron beam of the camera tube from the region of projection of the scale-line marker to the region of projection of the graticule.

7 Claims, 5 Drawing Figures

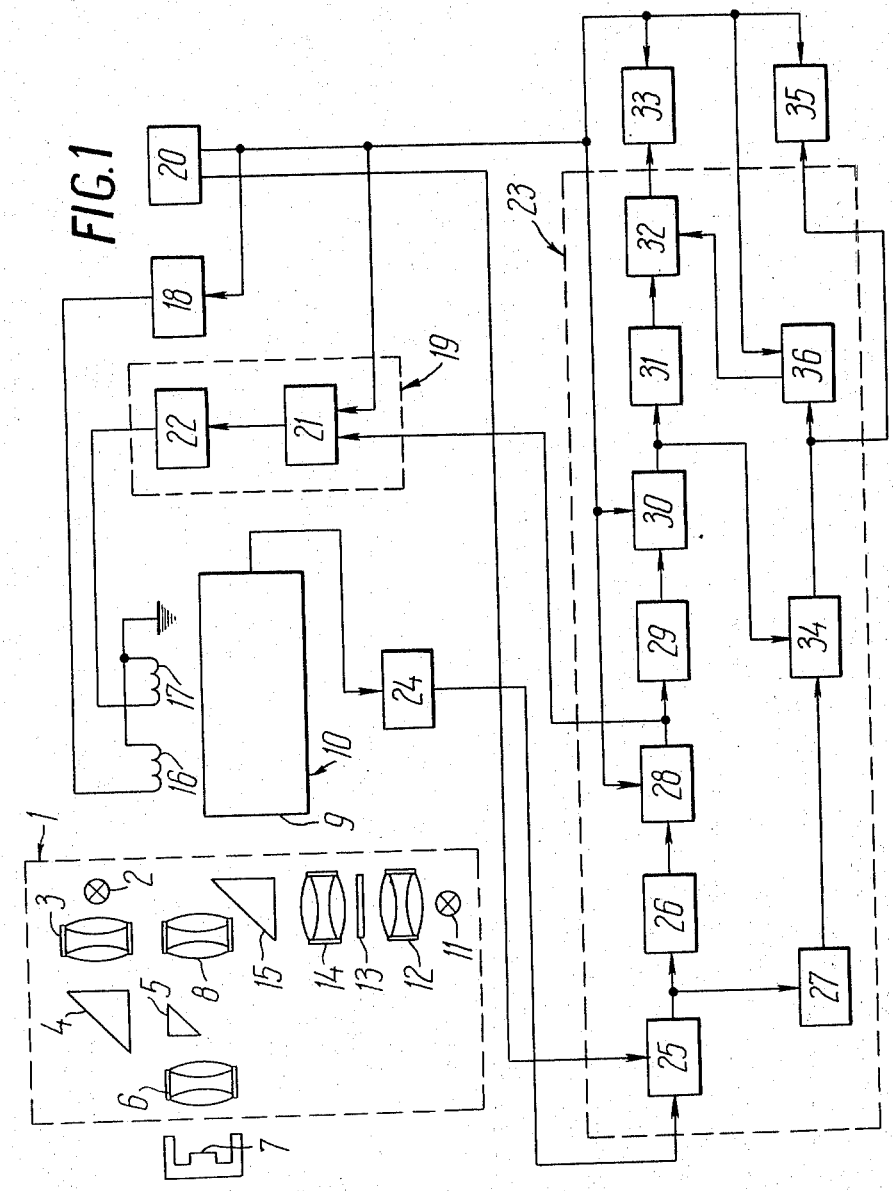

LINEAR DISPLACEMENT TRANSDUCER FOR A MOVABLE MEMBER OF A COORDINATE-BORING MACHINE

The present invention relates to linear displacement transducers for the movable member of a coordinate-boring machine, which comprise a table, slides, headstock and sleeve.

A prior art device for measuring linear displacements of a coordinate-boring machine (precision displacement transducer of Swiss "Dixi" company) comprises a camera tube and an optical system comprising a built-in graticule, which system is placed in front of the camera tube screen. A scale-line marker is mounted on the movable member of the machine. The optical system projects on the camera tube screen superimposed images of the lines of the scale-line marker and the graticule. As the electron beam crosses the projections of the scale-line marker and graticule lines on the camera tube screen, from the latter's output are taken off pulses which are sent to the input of a logical unit, wherein pulse selectors electrically separate the pulses corresponding to the lines of the scale-line marker and the graticule into two individual channels.

For each pulse corresponding to the line of the scale-line marker, pulses corresponding to the graticule lines are sent to the input of a scaler, thereby providing information on the position of the line of the scale-line marker relative to the graticule. The scale division of the graticule is equal to 10 mcm. In order to raise the scaling ratio by one order, a time-delay value corresponding to the required number of microns is assigned to the pulse corresponding to the line of the scale-line marker.

The graticule has two scales, one reading values up to 0.5 mm, the other — above 0.5 mm.

However, since the projections of the lines of the scale-line marker and the graticule are to be superimposed, the projection of the scale-line marker lines has to be much thicker than that of the graticule lines, if the pulses from these lines are to be electrically separated. This feature detracts from the transducer accuracy, for scaling is performed from the midpoint of the scale-line marker line. The pulse selectors in the logical unit render the transducer more complicated than it should be.

The scale-line marker is mounted on the movable element of the machine and not always duly protected from extraneous effects and dust penetration; moreover, the scale-line marker has microflaws on its surface.

When the scale-line marker projection is superposed on the graticule projection, all the defects are transferred onto this projection, which entails a possibility of reading error thereby impairing reliability. In addition, the uced for preliminary choosing the number of microns for a given coordinate and the particular graticule scale of a manually controlled machine bring efficiency down.

It is an object of the proposed invention to provide a displacement transducer for the movable member of a coordinate-boring machine which would provide for a higher accuracy, efficiency and reliability of scaling as against the known devices of this nature.

It is herein contemplated that there shall be provided a linear displacement transducer for the movable member of a coordinate-boring machine comprising a camera tube with a vertical and horizontal deflection systems which registers the displacements of the movable member by the displacements of the lines of a scale-line marker rigidly mounted on that movable member, an optical system comprising an objective and a deviating prism disposed about the same optical axis as that of the scale-line marker, as well as a graticule, which optical system projects the lines of the scale-line marker and the graticule on the camera tube screen, and also comprising a line scan unit connected with the horizontal deflection system of the camera tube, as well as a logical unit, the input thereof electrically connected with the output of the camera tube, at the output of which logical unit there is at least one scaler counting the pulses supplied from the output of the camera tube and corresponding to the graticule lines, in accordance with the invention, the optical system is provided with a second deviating prism, the graticule with the second deviating prism being disposed exteriorly of said optical axis such that the projection of the graticule lines on the camera tube screen is shifted relative to the projection of the lines of the scale-line marker, and the transducer also has an automatic Y-shift unit electrically connected with the vertical deflection system of the camera tube, which automatic Y-shift unit permits shifting the camera tube beam from the region of the scale-line marker line projection to the region of the graticule line projection, and which is controlled by a signal supplied by the logical unit at the instant the logical unit receives from the camera tube a pulse corresponding to the line of the scale-line marker.

The logical unit of the linear displacement transducer of the invention may comprise a clock-pulse generator whose input is electrically connected with the output of a first trigger and the output is coupled with the first input of a first AND circuit, the second input of the first AND circuit is coupled with the output of a second trigger, the input of the latter is connected with the output of a second AND circuit, and the input of the first trigger together with the output of the second AND circuit are electrically connected with the output of a third AND circuit, the input of the third AND circuit is coupled with the output of the camera tube, the outputs of the first and second AND circuits are connected with scalers, and the output of the first trigger is connected with an automatic Y-shift unit and with the second input of the second AND circuit.

The logical unit is preferably provided with a time-delay unit for the pulses corresponding to the lines of the scale-line marker as well as with a third trigger, the time-delay unit and the third trigger connected in series with each other, and the input of the time-delay unit is connected with the output of the first trigger, while the output of the third trigger is connected with the input of the clock-pulse generator and with the second input of the second AND circuit.

It is desirable that the logical unit be provided with two pulse shapers, one connected between the output of the third AND circuit and the input of the first trigger, the other connected between the output of the third AND circuit and the first input of the first AND circuit.

The line scan unit may be a sawtooth voltage generator, the non-linearity of the output signal thereof controlled in accordance with the magnitude of distorsion of the optical system.

The time-delay unit may be a flip-flop generator, wherein the time of pulse delay is controlled by the choice of parameters of the flip-flop generator elements in accordance with the choice of non-linearity of the output signal of the line scan unit depending on the magnitude of distorsion of the optical system.

Such features as direct digital readout of the table position and a graticule with a single scale simplify handling of the proposed linear displacement transducer for the movable member of a coordinate-boring machine, whereby improving efficiency. The projections of the scale-line marker and the graticule being spaced from each other on the camera tube screen, the readout gains in accuracy and reliability.

In what follows the present invention is discussed in detail as to the possible embodiments thereof with reference to the accompanying drawings, wherein:

FIG. 1 is a block diagram of the present linear displacement transducer for the movable member of a coordinate-boring machine with an optical system and a scale-line marker;

Figure 5:
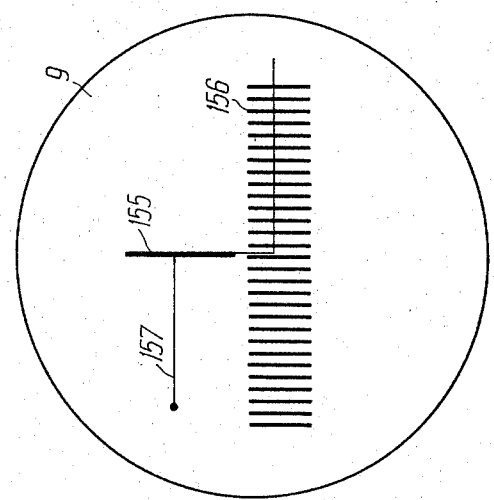
FIG. 5 is a diagram of a camera tube screen with projections of the lines of a scale-line marker and a graticule in the transducer according to the invention.

The linear displacement transducer for the movable member of a coordinate-boring machine in accordance with the invention, comprises an optical system 1 (FIG. 1) made up of a light source 2 and a condensing lens 3, which provide a parallel beam of light. This beam of light passing through deviating lenses 4 and 5 and a short-focus objective 6 illuminates the working surface of a scale-line marker 7 mounted on the movable member of a coordinate-boring machine which in the present embodiment is a table (not shown).

The image of the working surface of the scale-line marker 7 disposed at the focal plane of the objective 6 is magnified by the objective 6 and via an eyepiece 8 is transmitted to a screen 9 of a camera tube 10.

The scale division of the scale-line marker 7 is equal to 1 mm.

Besides, the optical system 1 comprises a second light source 11 with a condensing lens 12 which illuminate a graticule 13 with a scale division of 10 mcm. Through an objective 14 and a deviating prism 15 the image of the graticule 13 is projected on the screen 9 of the camera tube 10 in a position displaced relative to the image of the scale-line marker 7. The camera tube 10 is equipped with an electron beam horizontal deflection system 16 and an electron beam vertical deflection system 17, which are controlled respectively by a line scan unit 18 and an automatic Y-shift unit 19.

The line scan unit 18 is a sawtooth voltage generator controlled by an external sync unit 20.

The automatic Y-shift unit 19 comprises a trigger 21 serially coupled with a push-pull amplifier 22. The automatic Y-shift unit 19 is coupled by way of its input to a logical unit 23, the input of the latter coupled via an amplifier 24 with the output of the camera tube 10.

At the input of the logical unit 23 there is an AND circuit 25 connected by way of its output with two pulse shapers 26 and 27, each pulse shaper being a flip-flop generator. The output of the pulse shaper 26 is connected with the input of a trigger 28, the latter's output supplying a control signal to the automatic Y-shift unit 19.

Besides, the output of the trigger 28 is connected with a time-delay unit 29 which delays a passing signal for a predetermined length of time before the signal is applied to the input of a trigger 30. The output of the trigger 30 is connected with a clock-pulse generator 31 from the output of which pulses are sent to the first input of an AND circuit 32 and thence to a scaler 33.

The output of the trigger 30 is also connected with the first input of an AND circuit 34 which is opened by pulses applied to precisely this input. The second input of the AND circuit 34 is coupled with the output of the pulse shaper 27, and from the output of the AND circuit 34 signals are supplied to a scaler 35.

The output of the AND circuit 34 is also connected with the input of a trigger 36 whose output is connected with the second input of the AND circuit 32.

The entire circuit is controlled by a sync unit 20 which determines the scanning frequency and the readout time and which, upon termination of scaling, resets the circuit to its initial state. The output of the sync unit 20 is connected with the line scan unit 18, the trigger 21 of the automatic Y-shift unit 19, the AND circuit 25, the triggers 28 and 30 of the logical unit 23 and the scalers 33 and 35.

Figure 2:
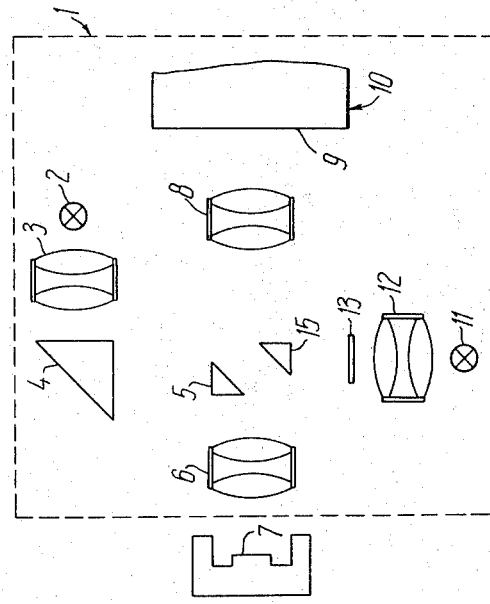
FIG. 2 is another embodiment of the optical system of the transducer according to the invention.

Another embodiment of the optical system 1 is similar to the one described above, the only difference consisting in that the source of light 11 (FIG. 2) with the condensing lens 12, the graticule 13 and the deviating prism 15 are placed in front of the eyepiece 8. Thus, the eyepiece 8 is a common feature in the transmission of the images of the working surface of the scale-line marker 7 and the graticule 13 to the screen 9 of the camera tube 10.

Figure 3:
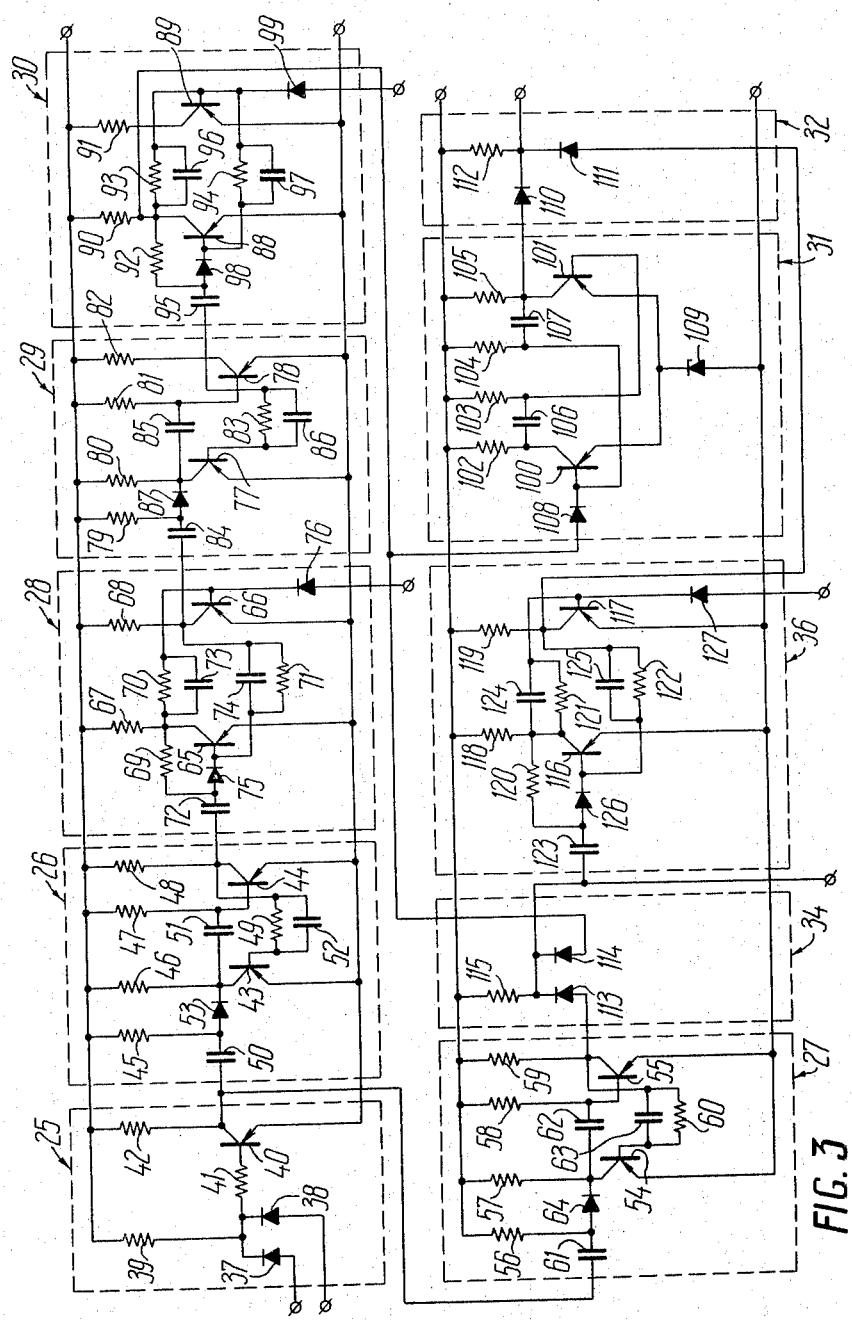
FIG. 3 is a schematic circuit diagram of a logical unit for the transducer according to the invention.

The AND circuit 25 (FIG. 3) is built around two diodes 37 and 38 and a resistor 39 together with an inverter triggering a transistor 40, the transistor base circuit comprising a resistor 41, and the transistor collector circuit comprising a resistor 42.

The pulse shaper 26 is a flip-flop generator built around transistors 43 and 44, resistors 45, 46, 47, 48 and 49, capacitors 50, 51, 52 and a diode 53, with high-level pulses sent through the collector circuit of the transistor 43.

The pulse shaper 27 is a flip-flop generator built around transistors 54 and 55, resistors 56, 57, 58, 59 and 60, capacitors 61, 62, 63 and a diode 64, in a similar manner with the circuit of the pulse shaper 26; in the pulse shaper 27 high-level pulses are sent through the collector circuit of the transistor 54.

The trigger 28 is built around transistors 65 and 66, resistors 67, 68, 69, 70 and 71, capacitors 72, 73 and 74 and diodes 75 and 76, with two separate inputs through which high-level pulses are sent through the base circuits of the transistors 65 and 66.

The time-delay unit 29 is a flip-flop generator built around, similarly with the units 26 and 27, transistors 77 and 78, resistors 79, 80, 81, 82 and 83, capacitors 84, 85 and 86 and a diode 87. The trigger 30 is built around transistors 88 and 89, resistors 90, 91, 92, 93 and 94, capacitors 95, 96 and 97 and diodes 98 and 99, with two separate inputs through which high-level pulses are sent through the base circuits of the transistors 88 and 89.

The clock-pulse generator 31 is a multivibrator built around transistors 100 and 101, resistors 102, 103, 104 and 105, capacitors 106 and 107 and a diode 108. In addition, the multivibrator comprises a Zener diode 109 required to impress a negative potential across the emitters of the transistors 100 and 101 and blocking the multivibrator when a zero potential is impressed across the base of the transistor 100.

The AND circuit 32 is built around two diodes 110 and 111 and a resistor 112.

The AND circuit 34 is built around two diodes 113 and 114 and a resistor 115.

The trigger 36 is built around transistors 116 and 117, resistors 118, 119, 120, 121 and 122, capacitors 123, 124 and 125 and diodes 126 and 127, with two separate inputs through which high-level pulses are sent through the base circuits of the transistors 116 and 117.

Figure 4:
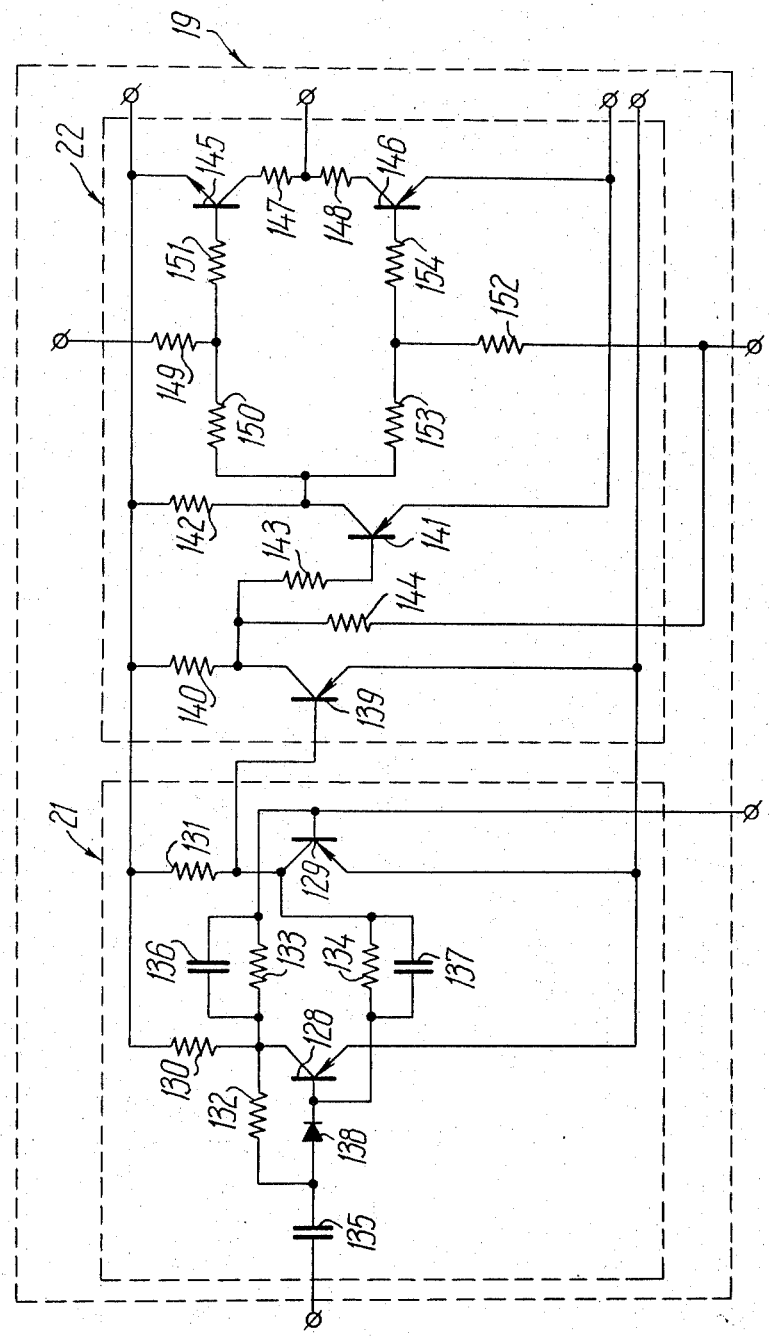
FIG. 4 is a schematic circuit diagram of an automatic Y-shift unit of the present transducer.

FIG. 4 is a schematic circuit diagram of the automatic Y-shift unit 19 made up of the trigger 21 and the push-pull amplifier 22.

The trigger 21 is built around transistors 128 and 129, resistors 130, 131, 132, 133 and 134, capacitors 135, 136 and 137 and a diode 138, with two separate inputs through which high-level pulses are sent through the base circuits of the transistors 128 and 129.

At the input of the push-pull amplifier 22 there are two serially connected inverters. One of them is built around a transistor 139 and a resistor 140. The other inverter is built around a transistor 141, a resistor 142 and a bias circuit comprising resistors 143 and 144.

At the output of the transistor 141 there is an emitter follower with a push-pull output built around transistors 145, 146, resistors 147, 148 with bias circuits which comprise respective resistors 149, 150 and 151, 152, 153, 154.

The proposed linear displacement transducer for the movable member of a coordinate-boring machine operates in the following manner.

The optical system 1 projects the images of the scale-line marker 7 and the graticule 13 on the screen 9 of the camera tube 10.

FIG. 5 is a diagram of the screen 9 showing a projection 155 of the lines of the scale-line marker 7 and a projection 156 of the lines of the graticule 13, as well as an electron beam trace 157.

In the initial state the electron beam is shifted to the top left-hand position on the screen 9 of the camera tube 10 (FIG. 1 and 5). After the line scan unit 18 has been triggered, the electron beam starts sweeping in a horizontal direction from left to right.

At the instant the electron beam crosses the dark image of the projection 155, at the output of the camera tube 10 there appears a signal which is sent via the amplifier 24 to the input of the AND circuit 25 of the logical unit 23.

From the output of the AND circuit 25 the signal is fed to the pulse shapers 26 and 27.

From the output of the pulse shaper 26 a pulse is sent to the input of the trigger 28; the duration of the pulse is of the order of 0.1 of the scaling ratio, as dictated by the need to reduce the dead band in scaling.

From the output of the pulse shaper 27 a pulse of duration equal to some 0.1 of the scaling ratio is sent into the AND circuit 34 which is closed and does not pass the pulse any further.

The pulse from the pulse shaper 26 initiates the trigger 28, the latter's leading edge triggering the time-delay unit 29, and the trigger 21 of the automatic Y-shift unit 19 is put into its conducting state. From the output of the trigger 21 the signal is applied to the push-pull amplifier 22 which generates a signal of the required level and polarity sent to the vertical deflection system 17 of the camera tube 10, which deflection system deflects the electron beam from the region of the projection 155 of the lines of the scale-line marker 7 to the region of the projection 156 of the lines of the graticule 13.

The delayed signal from the output of the unit 29 resets the trigger 30 which in turn initiates the clock-pulse generator 31, simultaneously opening the AND circuit 34.

The clock-pulse generator 31 generates pulses with a duration corresponding to the scaling ratio, which pulses are sent to the scaler 33 through the initially open AND circuit 32. The scaler 33 counts the pulses whose number is equal to the number of microns corresponding to the position of the projection 155 of the lines of the scale-line marker 7 relative to the projection 156 of the closest line of the graticule 13.

Having shifted to the region of the projection 156 of the lines of the graticule 13, the electron beam continues sweeping in a horizontal direction.

At the instant the electron beam crosses the dark image of the projection 156 of the lines of the graticule 13, at the output of the camera tube 10 there appear signals which via the amplifier 24 and the AND circuit 25 are to the input of the pulse shaper 27. From the output of the pulse shaper 27 pulses of duration equal to some 0.1 of the scaling ratio are applied to the input of the AND circuit 34. At the instant of arrival of the pulse corresponding to the first line of the graticule 13 the AND circuit 34 is still closed, for the pulse corresponding to the line of the scale-line marker 7 has been delayed by the time-delay unit 29, and the signal to open the AND circuit 34 has not yet come from the output of the trigger 30.

By the instant of arrival from the pulse shaper 27 of the pulse corresponding to the second line of the graticule 13, the AND circuit 34 has already been opened and the second and the subsequent pulses pass into the scaler 35.

The first pulse from the AND circuit 34, i.e. the pulse corresponding to the second line of the graticule, initiates the trigger 36 whose signal blocks the AND circuit 32 thereby cutting off the pulses corresponding to microns from the scaler 33.

Thus, the scalers 33 and 35 provide information as to the position of the line of the scale-line marker 7 relative to the lines of the graticule 13 within an interval equal to 1 mm.

The error of reproduction of a magnified image of the working surface of the scale-line marker 7 on the screen 9 by the optical system 1 depends by and large on the distorsion of the optical system. To compensate this error, the line scan unit 13 is formed as a sawtooth voltage generator with controlled non-linearity.

The value of non-linearity is chosen such as to make any speed variation $\pm \Delta V$ of the electron beam travel at any point of the working zone of the screen 9 of the camera tube 10 correspond to the distorsion of the optical system 1. The time-delay unit 29 controls the time of delay of the signal coming from the trigger 28 to initiate the clock-pulse generator 31.

Thus, the pulse corresponding to the line of the scale-line marker 7 is delayed relative to the pulses corresponding to the lines of the graticule 13.

At a fixed time of this delay $\Delta t$, the electron beam will traverse different distances $\Delta S$ depending on its position on the screen 9 of the camera tube 10.

Mathematically, it is expressed in the following way:

$$\Delta S = (V_o \pm \Delta V)\cdot \Delta t,$$

or $$\Delta S = V_o \cdot \Delta t \pm \Delta V \cdot \Delta t,$$

where $V_o$ is the speed of travel of the electron beam in the centre of the screen 9 of the camera tube 10.

If the electron beam speed of travel deviates from $V_o$ by a certain value $\pm \Delta V$ chosen in accordance with the distorsion of the optical system, the time-delay unit 29 sets a time-delay value $\Delta t$ such that the distance traversed by the electron beam $\Delta V \cdot \Delta t$ will be equal to the error of position of the projection 155 of the line of the scale-line marker 7 caused by the distorsion of the optical system.

Since the quantity $\Delta V \cdot \Delta t$ is opposite in sign to the error of projection of the line of the scale-line marker 7 due to the distorsion of the optical system 1, the error of measurement will be determined by their difference, and, should the absolute values of these quantities be equal, the error will be zero.

What is claimed is:

1. A linear displacement transducer for the movable member of a coordinate-boring machine, comprising: a scale-line marker rigidly mounted on said movable member; an optical system comprising an objective and a first deviating prism disposed about the same optical axis as that of said scale-line marker, a second deviating prism and a graticule disposed exteriorly of said optical axis; a camera tube with a horizontal and vertical deflection systems, said optical system projecting said scale-line marker and said graticule on the screen of said camera tube such that the two projections are displaced relative to each other; a logical unit, the input thereof being connected with the output of said camera tube; an automatic Y-shift unit connected with said vertical deflection system of said camera tube, shifting the beam of said camera tube from the region of said scale-line marker projection to the region of said graticule projection and controlled by a signal arriving from said logical unit at the instant said camera tube sends a pulse which corresponds to the line of said scale-line marker; a line scan unit connected with said horizontal deflection system of said camera tube; at least one scaler electrically connected with the output of said logical unit and counting the pulses sent from the output of said camera tube, which pulses correspond to the lines of said graticule.

2. A linear displacement transducer for the movable member of a coordinate-boring machine, comprising: a scale-line marker rigidly mounted on said movable member; an optical system comprising an objective and a first deviating prism disposed about the same optical axis as that of said scale-line marker, a second deviating prism and a graticule disposed exteriorly of said optical axis; a camera tube with a horizontal and vertical deflection systems, said optical system projecting said scale-line marker and said graticule on the screen of said camera tube such that the two projections are displaced relative to each other; a logical unit, the input thereof being connected with the output of said camera tube; an automatic Y-shift unit connected with said vertical deflection system of said camera tube, for shifting the beam of said camera tube from the region of said scale-line marker projection to the region of said graticule projection and controlled by a signal arriving from said logical unit at the instant said camera tube sends a pulse corresponding to the line of said scale-line marker; a line scan unit connected with said horizontal deflection system of said camera tube; at least one scaler electrically connected with the output of said logical unit and counting the pulses sent from the output of said camera tube, which pulses correspond to the lines of said graticule, said logical unit comprising a clock-pulse generator, having an input electrically connected with the output of a first trigger, the output of said clock-pulse generator being connected with the first inputs of a first AND circuit, the latter's second input being connected with the output of a second trigger, the input of said second trigger being connected with the output of a second AND circuit, the input of said first trigger and the first input of said second AND circuit being electrically connected with the output of a third AND circuit, the input thereof being electrically connected with the output of said camera tube, said output of said first AND circuit and said output of said second AND circuit being connected with said scalers, said output of said first trigger being connected with said automatic Y-shift unit and with the second input of said second AND circuit.

3. A linear displacement transducer for the movable member of a coordinate-boring machine as defined in claim 2, wherein said logical unit comprises a time-delay unit for the pulses corresponding to said lines of said scale-line marker as well as a third trigger, said time-delay unit and said third trigger being serially interconnected, the output of said time-delay unit being connected with said output of said first trigger, the output of said third trigger being connected with said input of said clock-pulse generator and with said second input of said second AND circuit.

4. A linear displacement transducer for the movable member of a coordinate-boring machine as defined in claim 2, wherein said logical unit comprises two pulse shapers, one connected between said output of said third AND circuit and said input of said first trigger, the other pulse shaper being connected between the same output of said third AND circuit and said first input of said first AND circuit.

5. A linear displacement transducer for the movable member of a coordinate-boring machine, comprising: a scale-line marker rigidly mounted on said movable member; an optical system comprising an objective and a first deviating prism disposed about the same optical axis as that of said scale-line marker, a second deviating prism and a graticule disposed exteriorly of said optical axis; a camera tube with a horizontal and vertical deflection systems, said optical system projecting said scale-line marker and said graticule on the screen of said camera tube such that the two projections are displaced relative to each other; a logical unit, the input thereof being connected with the output of said camera tube; an automatic Y-shift unit connected with said vertical deflection system of said camera tube, for shifting the beam of said camera tube from the region of said scale-line marker projection to the region of said graticule projection and controlled by a signal arriving from said logical unit at the instant said camera tube sends a pulse corresponding to the line of said scale-line marker; a line scan unit connected with said horizontal deflection system of said camera tube; at least one scaler electrically connected with the output of said logical unit and counting the pulses sent from the output of said camera tube, which pulses correspond to the lines of said graticule, said line scan unit being a sawtooth voltage generator with a controlled linearity of the output signal depending on the magnitude of dispersion of said optical system.

6. A linear displacement transducer for the movable member of a coordinate-boring machine as defined in claim 3, wherein said time-delay unit is a flip-flop generator with pulse time delay being controlled by the choice of parameters of the generator elements in accordance with the choice of non-linearity of the output signal of said line scan unit, said non-linearity being determined by said distorsion of said optical system.

7. A linear displacement transducer as defined in claim 1 wherein said automatic shift unit comprises an automatic electron-beam displacement unit, the marker position relative to the graticule being determined by said automatic electron-beam displacement unit as the electron beam meets the line of the scale-line marker while moving to the graticule region.

* * * * *